(12) United States Patent
Lachapelle et al.

(10) Patent No.: US 8,185,387 B1
(45) Date of Patent: May 22, 2012

(54) AUTOMATIC GAIN CONTROL (75) Inventors: Serge Lachapelle, Vallentuna (SE); Alexander Kjeldaas, Stockholm (SE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/295,980

(22) Filed: Nov. 14, 2011

(51) Int. Cl.
*G10L 19/14* (2006.01)

(52) U.S. Cl. ........................ 704/225; 704/246; 379/88.19

(58) Field of Classification Search .................. 704/225, 704/246–250, 273; 379/88.19
See application file for complete search history.

(56) References Cited

U.S. PATENT DOCUMENTS

| | | | | |
|---|---|---|---|---|
| 4,499,578 A | * | 2/1985 | Marouf et al. | 370/267 |
| 4,528,519 A | * | 7/1985 | van Driest | 330/279 |
| 5,974,379 A | * | 10/1999 | Hatanaka et al. | 704/225 |
| 6,987,992 B2 | | 1/2006 | Hundal et al. | |
| 6,993,480 B1 | * | 1/2006 | Klayman | 704/226 |
| 7,035,418 B1 | * | 4/2006 | Okuno et al. | 381/310 |
| 2005/0063533 A1 | | 3/2005 | Dettmer | |
| 2006/0018457 A1 | | 1/2006 | Unno et al. | |
| 2006/0133623 A1 | | 6/2006 | Amir et al. | |
| 2007/0263846 A1 | | 11/2007 | Fratti | |

OTHER PUBLICATIONS

Dunn et al., "Approaches to Speaker Detection and Tracking in Conversational Speech," Digital Signal Processing, vol. 10, Nos. 1-3, Jan./Apr./Jul. 2000 (pp. 93-112).

* cited by examiner

*Primary Examiner* — Abul Azad
(74) *Attorney, Agent, or Firm* — Shumaker & Sieffert, P.A.

(57) ABSTRACT

In general, the techniques are described for adjusting audio gain levels for multi-talker audio. In one example, an audio system monitors an audio stream for the presence of a new talker. Upon identifying a new talker, the system determines whether the new talker is a first-time talker. For a first-time talker, the system executes a fast-attack/decay automatic gain control (AGC) algorithm to quickly determine a gain value for the first-time talker. The system additionally executes standard AGC techniques to refine the gain for the first-time talker while the first-time talker continues speaking. When a steady state within a decibel threshold is attained using standard AGC for the first-time talker, the system stores the steady state gain for the first-time talker to storage. Upon identifying a previously-identified talker, the system retrieves from storage the steady state gain for the talker and applies the steady state gain to the audio stream.

17 Claims, 4 Drawing Sheets

AUTOMATIC GAIN CONTROL

TECHNICAL FIELD

The disclosure relates to adjusting a gain applied to an audio stream.

BACKGROUND

Raw audio signals are a convolution of all frequencies received at a microphone and converted to the audio signal. In a multi-talker environment, this convolution of frequencies includes voice patterns for each of the talkers that enable an audio system to identify a current talker by processing the audio signal and identifying an associated voice pattern for the current talker.

SUMMARY

In one example, a method comprises processing an audio signal with an audio system to identify a first talker. The method also comprises determining whether the audio system stores an association between the first talker and a gain and, when the audio system does not store the association between the first talker and the gain, modifying an automatic gain control (AGC) algorithm with the audio system to increase at least one of an attack or decay rate and applying the modified AGC algorithm to the audio signal to determine the gain for the first talker. The method also comprises applying, with the audio system, the gain for the first talker to a representation of the audio signal to produce an output audio signal, and outputting the output audio signal from the audio system.

In another example, an audio system comprises means for processing an audio signal with an audio system to identify a first talker. The audio system also comprises a talker identification module that determines whether the audio system stores an association between the first talker and a gain. The audio system also comprises an automatic gain control (AGC) module, wherein the talker identification module, when the audio system does not store the association between the first talker and the gain, modifies the AGC module to increase at least one of an attack or decay rate, wherein the AGC module applies the modified AGC algorithm to the audio signal to determine the gain for the first talker, wherein the AGC modules applies the gain for the first talker to a representation of the audio signal to produce an output audio signal, and wherein the audio system outputs the output audio signal.

In another example, a computer-readable storage medium comprises instructions that, when executed, perform operations comprising processing an audio signal with an audio system to identify a first talker, determining whether the audio system stores an association between the first talker and a gain, and when the audio system does not store the association between the first talker and the gain, modifying an automatic gain control (AGC) algorithm with the audio system to increase at least one of an attack or decay rate and applying the modified AGC algorithm to the audio signal to determine the gain for the first talker. The instructions, when executed, further perform operating comprising applying, with the audio system, the gain for the first talker to a representation of the audio signal to produce an output audio signal, and outputting the output audio signal from the audio system.

The details of one or more embodiments are set forth in the accompanying drawings and the description below. Other features, objects, and advantages will be apparent from the description and drawings, and from the claims.

DETAILED DESCRIPTION

When conversation in a multi-talker environment transitions from a soft talker, such as a talker further from a shared microphone, to a loud talker, such as a talker nearer to the shared microphone (or vice-versa), a time-averaged automated gain control (AGC) algorithm that modifies output gain on the order of a few seconds may not adjust with sufficient rapidity to provide a consistent volume. As a result, the loud talker may be insufficiently attenuated and/or the soft talker insufficiently amplified during operation of the AGC algorithm.

In general, techniques are described for adjusting audio gain levels for multi-talker audio. In one example, an audio system operating in a multi-talker environment continually monitors an audio stream for the presence of a new talker. Upon identifying a new talker, the audio system determines whether the new talker is a first-time talker, whose voice print is unfamiliar to the system. Where the new talker is a first-time talker, the audio system does not have a record of a voice print associated with a previously-determined audio gain level for the talker. For a first-time talker, the audio system executes a fast-attack/decay AGC algorithm, as described in further detail below, to quickly determine a gain value for the first-time talker and applies this gain value to the audio output. The audio system additionally executes standard AGC techniques to refine the gain for the first-time talker while the first-time talker continues speaking.

When a steady state within a decibel range is attained using standard AGC for the first-time talker, the audio system stores the steady state gain for the first-time talker to storage in association with a voice print for the first-time talker. Upon identifying a previously-identified talker, the system retrieves from storage the steady state gain previously determined for the talker and applies the steady state gain to the audio stream. As a result, the audio system uses respective, pre-determined gains for multiple talkers and fast-attack AGC algorithms for unidentified talkers to rapidly determine a gain for multi-talker audio.

Techniques of this disclosure may provide one or more advantages. For example, using techniques of this disclosure, an audio system may rapidly transition the gain applied to both identified and unidentified talkers in a multi-talker environment.

Figure 1:
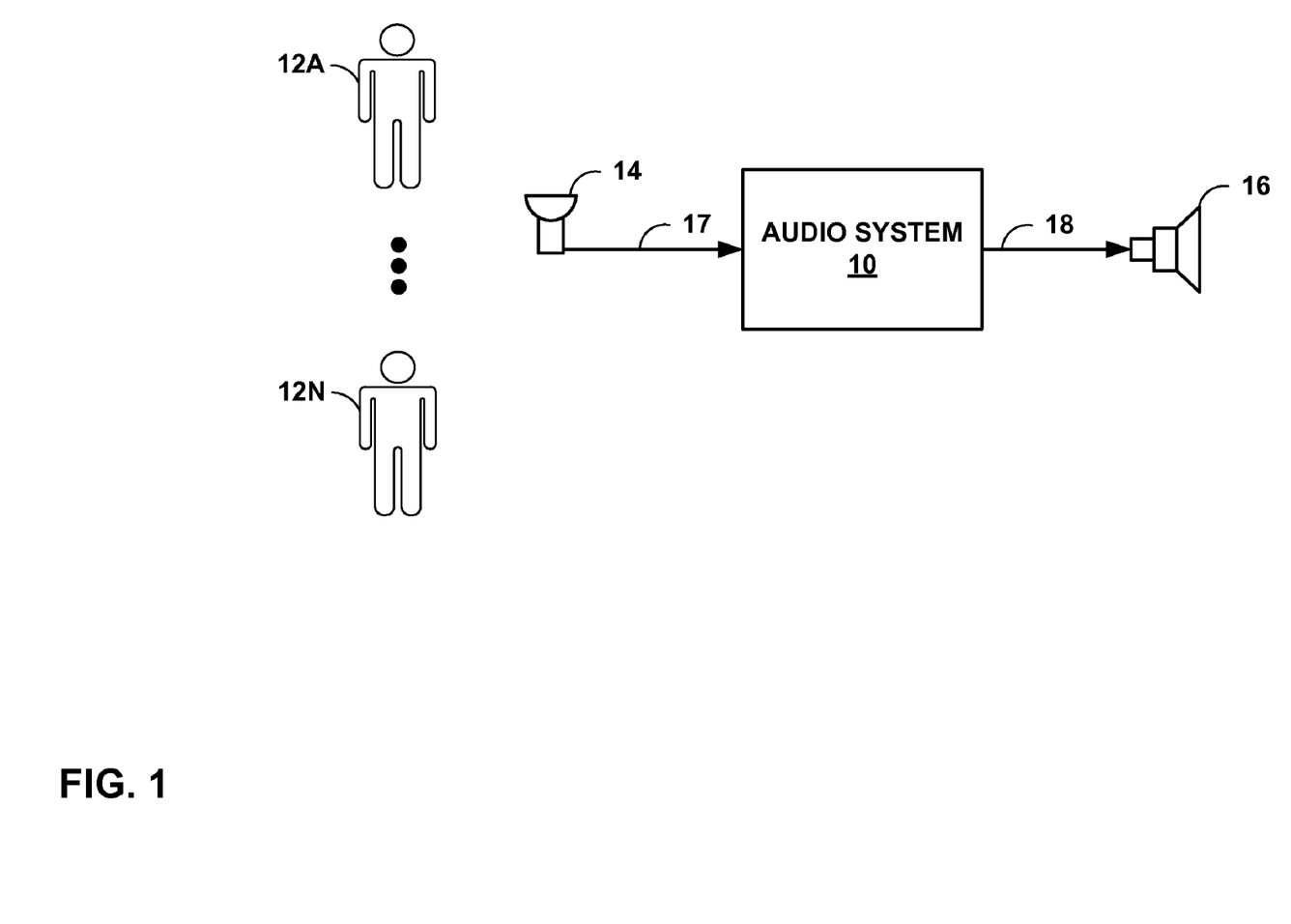
FIG. 1 is a block diagram illustrating an audio system that adjusts a gain applied to an electrical signal using voice-print matching and fast-attack gain control techniques described in this disclosure.

FIG. 1 is a block diagram illustrating audio system 10, an example of a gain control system that adjusts a gain applied to an electrical signal using voice-print matching and fast-attack gain control techniques described in this disclosure. Microphone 14 captures ambient sound in its vicinity, including speech sound generated by one or more of a plurality of talkers 12A-12N (collectively "talkers 12") speaking serially and/or simultaneously (cross-talk). Each of talkers 12 may speak in bursts of any amount of time (e.g., between on the order of tens of milliseconds to on the order of hours). Microphone 14 transforms the ambient sound into an electrical signal 17 that is received by audio system 10. While described in this disclosure with respect to humans, talkers 12 may represent any audio source or recordings thereof.

In some aspects, electrical signal 17 represents an electrical signal reproduced by a playback device (e.g., a Compact Disc (CD) player, computer program, or tape player) using data, encoded from talkers 12 sound or sound provided by any other audio source, previously recorded on a storage medium (e.g., a CD, hard disk, record, tape, or Flash memory).

Audio system 10 processes electrical signal 17 to output a modified electrical signal 18 that causes speaker 16 to output audio that has a more consistent volume (e.g., within an acceptable decibel (dB) range) while talkers 12 are speaking. Audio system 10 may represent a portable audio player, a mixing board, a smart phone, a public address (PA) system, or a telephone conference or video conferencing system, for example. An acceptable dB range may be user-configurable by any of talkers 12 or by a user, an administrator, or a sound engineer monitoring audio system for the context in which audio system 10 is operating, such as a teleconference or video conference, a concert or PA, or listening with a portable audio player. In some aspects, either or both of microphone 14 and speaker 16 may be embedded within a chassis or other type of casing that also contains audio system 10 or may be directly connected to audio system 10 via wire connectors. In some aspects, either or both of microphone 14 and speaker 16 may be remote from audio system 10, though communicatively coupled via a network, such as a public switched telephone network (PSTN), a public land mobile network (PLMN), an enterprise virtual private network (VPN), the Internet, a Wi-Fi connection, or a $3^{rd}$ Generation Partnership Project (3GPP) cellular radio network, for example. In some aspects, either or both of microphone 14 and speaker 16 may be wireless. In some aspects, microphone 14 may be a plurality of microphones arranged among talkers 12 in various combinations. Still further, each of talkers 12 may, in some aspects, be associated with a different instance of audio system 10.

To process electrical signal 17 to output modified electrical signal 18 within the acceptable dB range and maintain the sound fidelity for talkers 12, audio system 10 applies automatic gain control (AGC) techniques on a per-talker 12 basis. The sound (e.g., speech, coughing, yelling, singing, etc.) generated by each of talkers 12 may have different characteristics depending on the identity of the talker and the distance of the talker from microphone 14. For example, a soft talker or a talker further from microphone 14 will tend to produce sound at microphone 14 having lower amplitude than sound produced by a loud talker or a talker nearer to microphone 14.

Audio system 10 monitors electrical signal 17 for individual talkers among talkers 12 in order to apply AGC techniques on a per-talker basis. Each of talkers 12 may interject sound at any time that is received and transformed by microphone 14 into electrical signal 17. Accordingly, different combinations of talkers 12 may be speaking at any particular time, with new talkers joining the conversation (i.e., the aggregated sound produced by talkers 12 and received by microphone 14) and current talkers leaving the conversation. Here, a "new" talker refers to one of talkers 12 that recently joined or rejoined the conversation.

To identify the audio presence of a new talker among talkers 12, audio system 10 processes electrical signal 17 using speaker detection and identification techniques. After detecting a new talker, audio system 10 may identify the talker to determine whether the new talker is a first-time talker. A "first-time" or "unidentified" talker, in various instances, refers to one of talkers 12 that audio system 10 has either not previously recognized or has deleted a record of a previous recognition from the system, or that has modified their voice such that audio system 10 is no longer able to recognize the talker despite having a record of previous recognition. Responsive to determining that the new talker detected in electrical signal 17 is a first-time talker, audio system 10 may execute a fast-attack/decay AGC algorithm to rapidly determine a gain value for the first-time talker, and audio system 10 may apply this determined gain value of electrical signal 17 to produce modified electrical signal 18. The fast-attack/decay AGC algorithm may converge to (alternatively, "stabilize at") a gain value for the first-time talker in less time than is required for standard AGC (e.g., on the order of hundreds of microseconds or milliseconds). Audio system 10 may, concurrently and/or subsequently, execute standard AGC to refine and apply the gain for the first-time talker while the first-time talker continues speaking.

When audio system 10 attains, using standard AGC, a steady state within a decibel threshold for the first-time talker, audio system 10 may associate the gain that achieves this steady state, or steady state gain, with the first-time talker. Upon detecting and identifying a previously identified talker among talkers 12 represented in electrical signal 17, audio system 10 may recall from a storage medium a prior associated steady state gain for the previously identified talker and may apply the prior associated steady state gain to electrical signal 17 to produce modified electrical signal 18. While audio system 10 may concurrently execute standard AGC to refine and apply the gain to electrical signal 17 generated by microphone 14 based on sounds produced by the previously identified talker, audio system 10, in various instances, at least initially applies the prior associated steady state gain to more quickly converge to an applied gain for the previously identified talker. Because standard AGC may require on the order of seconds to arrive at a steady state gain value based on the AGC feedback mechanism, the combination of applying fast-attack/decay AGC techniques for unidentified new talkers 12 with applying respective, pre-determined gains for previously identified new talkers 12 may allow audio system 10 to rapidly resolve an appropriate gain to apply to electrical signal 17 to produce modified electrical signal 18 that results, as transformed by speaker 16, in sound within an acceptable dB range, regardless of the particular one of talkers 12 that is a new talker. In addition, applying pre-determined gains for previously identified new talkers 12 may improve the consistency of the dB range of the sound for such talkers over fast-attack/decay AGC alone.

Figure 2:
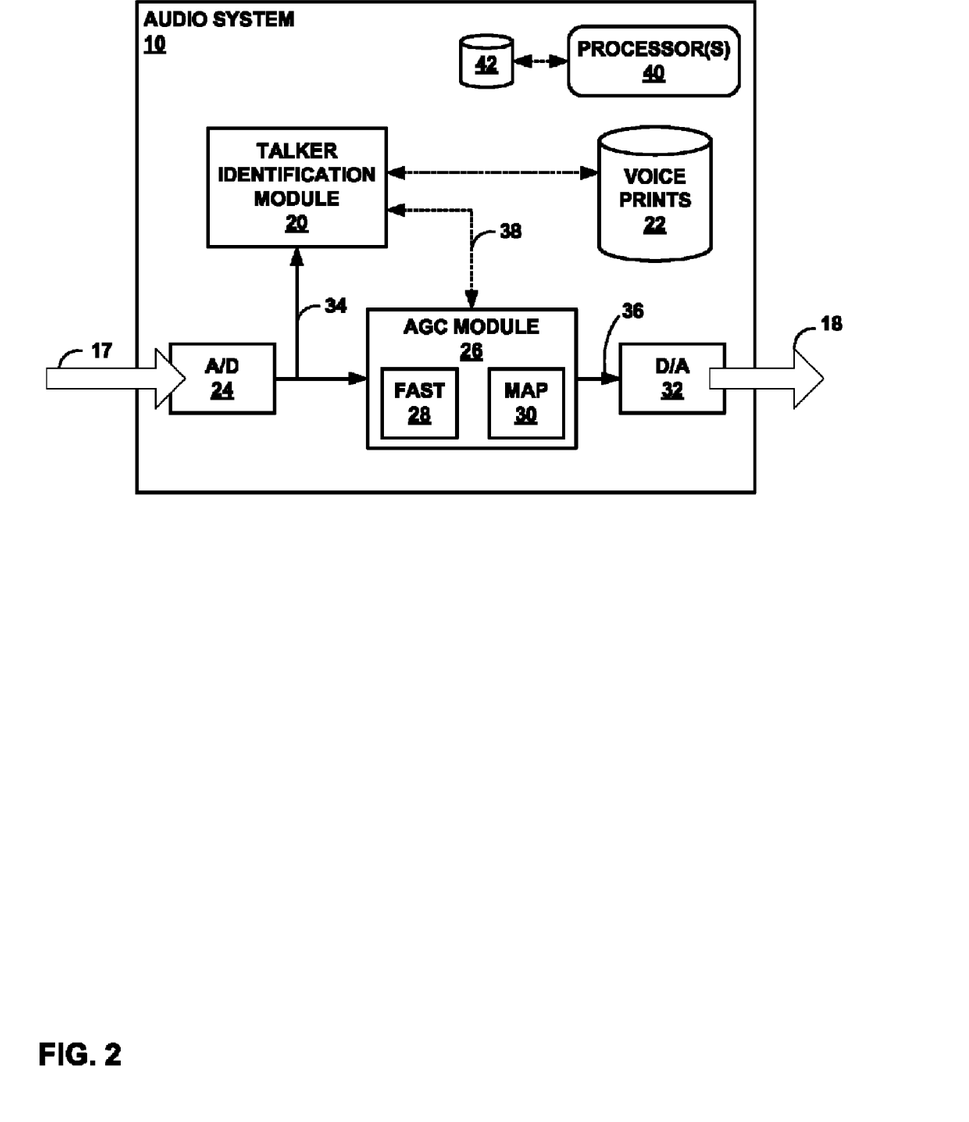
FIG. 2 is a block diagram illustrating an example instance of the audio system of FIG. 1 in further detail.

FIG. 2 is a block diagram illustrating an example instance of audio system 10 of FIG. 1 in further detail. Like numerals are used to identify like components from FIG. 1. Audio system 10 includes analog to digital (A/D) converter 24 that receives electrical signal 17 and outputs digital signal 34, a digital representation of electrical signal 17, for receipt by talker identification module 20 and by automatic gain control (AGC) module 26 (illustrated as "AGC MODULE 26"). In some instances, audio system 10 additionally includes an audio band encoder/decoder (CODEC) that converts electrical signal 17 to a digital audio signal, such as a Pulse Code Modulation (PCM) encoded digital audio signal, for output as digital signal 34. In some aspects, electrical signal 17 is a digital signal and A/D converter 24 may therefore be omitted from audio system 10.

Talker identification module 20 samples and analyzes digital signal 34 to extract voice prints with which to identify talkers. For some aspects, talker identification module 20 may use the Gaussian mixture model, universal background model (GMM-UBM) with internal or external segmentation to extract voice prints and to detect and identify new talkers. In other aspects, talker identification module 20 may use frequency estimation, pattern matching algorithms, vector quantization, decision trees, hidden Markov models, or other techniques. Talker identification module 20 continually monitors digital signal 34 to identify new talkers (i.e., the introduction or reintroduction of a talker to the conversation represented within digital signal 34. Voice prints 22 of audio system 10 includes a database or other data structure, stored on a computer-readable storage medium, that stores one or more voice prints for respective talkers previously identified by talker identification module 20. Each voice print may include distinctive signal parameters for talkers, a continuous sample of a talker's voice signal, cepstra or spectra feature vectors, or any other information that may be used by talker identification module 20 to match a corresponding talker to with the voice print. Talker identification module 20 may perform training techniques to learn voice print parameters for storage to voice prints 22. Each of voice prints 22 includes, as described in further detail below, an associated gain to be applied by AGC module 26 to digital signal 34 that includes audio signal for the talker that matches the voice print.

Upon extracting a voice print for a new talker in digital signal 34, talker identification module 20 compares the voice print to those stored by voice prints 22. A matching voice print in voice prints 22 indicates the new talker has been previously identified, and talker identification module 20 provides the talker identity of the matching voice print to AGC module 26 using control channel 38. Where voice prints 22 does not include a match for the newly identified voice print, talker identification module 20 indicates the incidence of an unidentified talker in digital signal 34 to AGC module 26 using control channel 38. In some aspects, talker identification module 20 may determine a plurality of voice prints 22 have a respective matching probability to a current talker. In such aspects, talker identification module 20 provides from voice prints 22 the associated, respective gains as well as the determined, respective matching probability for the plurality of voice prints 22. For example, upon determining a new talker has a probability 0.7 of matching voice print "A" of voice prints 22 and a probability 0.3 of matching voice print "B" of voice prints 22, talker identification module 20 reads and provides the associated gains together with the probabilities for voice prints "A" and "B" to AGC module 26. While described as identifying talkers using voice prints, talker identification module 20 may refer to an audio source identification module that identifies audio sources using audio prints that distinguish a plurality of audio sources.

AGC module 26 applies automatic gain control techniques to transform digital signal 34 to facilitate a signal amplitude for digital output signal 36 that, when transformed to audio by a speaker or other suitable device, remains within an acceptable dB range. Any of a number of suitable AGC algorithms may be applied to adapt the amplitude of digital signal 34 to facilitate the acceptable dB range. AGC algorithms typically rely on a feedback loop that monitors the result of a previously applied gain level based on an input quantity. Based on the result, typical AGC algorithms modify the gain level to transform the input quantity to an output quantity that results in a later input quantity that more nearly approximates the desired quantity. The relevant quantity for the present techniques is the signal amplitude for digital output signal 36. In some aspects, audio system 10 includes an analog or digital amplifier that receives from AGC module 26 a gain signal that the amplifier applies to one of electrical signal 17 or digital signal 34 to produce digital output signal 36 or modified electrical signal 18. In some aspects, the gain may be computed, stored, and applied as an audio filter or other device or value(s) for amplifying, attenuating, or otherwise modifying electrical signal 17 to produce modified electrical signal 18.

AGC module 26 applies standard AGC that converges on the order of seconds to a gain for a talker speaking at a substantially consistent volume. AGC module 26 provides the resultant gain to talker identification module 20 using control channel 38. Talker identification module 20 stores to voice prints 22 the resultant gain together with an associated voice print for the talker. In some instances, talker identification module 20 replaces within voice prints 22 an already stored gain for an associated voice print with the new resultant gain received from AGC module 26.

Fast AGC module 28 (illustrated as "fast 28") and mapping module 30 (illustrated as "map 30") of AGC module 26 perform techniques consistent with this disclosure to improve the speed at which AGC module 26 produces a digital output signal 36 that produces a volume with the currently acceptable dB range. In particular, upon receiving a signal from talker identification module 20 that a current talker of digital signal 34 is an unidentified talker, fast AGC module 28 modifies the standard AGC applied by AGC module 26 to digital signal 34 to increase the attack rate (corresponding to the speed at which the AGC techniques decrease gain responsive to a loud signal) and/or the decay rate (corresponding to the speed at which the AGC techniques increase gain responsive to the withdrawal of the loud signal). As a result, AGC module 26 rapidly modifies the gain applied to digital signal 34 relative to the speed at which AGC module 26 would otherwise modify the gain in accordance with standard AGC, thus quickly producing a digital output signal 36 that results in an acceptable volume. Fast AGC module 28 may represent a separate integrated circuit or processor that performs fast attack/decay AGC techniques, when signaled, in place of standard AGC performed by AGC module 26.

Because fast-attack/decay AGC techniques have deficiencies relating to gain stability (e.g., temporary, slight modulations in input amplitude can result in large gain adaptations), mapping module 30 applies a predetermined gain value received from talker identification module 20 for previously identified talkers. As described above, when talker identification module 20 identifies a matching one of voice prints 22 for digital signal 34, talker identification module 20 provides the associated gain for the matching voice print to AGC module 26. Provided the identified talker is producing sound at a volume substantially consistent to the previous occurrence of receiving audio signal for the identified talker during which AGC module 26 determined the associated gain, mapping module 30 applies the associated gain to digital signal 34 to produce digital output signal 36 that meets an acceptable dB range for audio system 10.

In some aspects, audio system 10 detects microphone movement based on differences in computed gains for identified talkers with stored, associated gains for the identified talkers. For example, talker identification module 20 may identify a matching one of voice prints 22 for digital signal 34 for a new talker, which mapping module 30 initially applies to digital signal 34. Subsequently, AGC module 26 may compute a new gain for the talker due to differences in the amplitude of digital signal 34. AGC module 26 provides the new gain to talker identification module 20 via control channel 38. Talker identification module 20 compares the new gain to the gain previously stored for the talker in voice prints 22. If the difference exceeds a configurable threshold, then the microphone may have moved, which would cause each of talkers 12 to produce sound at the microphone that is divergent in amplitude from the sound produced at the microphone prior to the microphone movement. As a result, talker identification module 20 may apply the difference, e.g., relative or absolute, between the new gain and the gain previously stored to each of the gains associated with voice prints 22. In this way, each of the talkers associated with voice prints 22 has their respective stored gains adjusted in preparation for their next speaking turn.

In some aspects, audio system 10 may represent a device, such as a smart phone, that further includes an accelerometer, camera, infrared locator, or other component that tracks movement of the device. In such aspects, audio system 10 may compute a gain modification based on the movement information for the device received from the tracking component. For example, movement information may indicate that one of talkers 12 is moving further from a shared microphone. As a result, audio system 10 may compute gain modification that increases the gain applied to digital signal 34. In some aspects, audio system 10 may represent a device, such as a smart phone, that further includes or receives location data from a camera or other device that tracks movement of talkers 12. In these aspects, audio system may compute a gain modification on a per-speaker basis based on the movement information for the speakers received from the tracking component.

Digital to audio (D/A) converter 32 of audio system 10 converts digital output signal 36 to modified electrical signal 18, which may represent an analog signal. In some instances, audio system 10 additionally includes an audio band CODEC that converts digital output signal 36 to modified electrical signal 18. In some aspects, modified electrical signal 18 is a digital signal and D/A converter 32 may therefore be omitted from audio system 10.

One or more processors 40 of audio system 10 execute to perform the functionality of various modules of audio system 10. Processors 40 may include any one or more of a microprocessor, a controller, a digital signal processor (DSP), a voice band audio processor, an application specific integrated circuit (ASIC), a field-programmable gate array (FPGA), or equivalent discrete or integrated logic circuitry. Additionally, the functions attributed to processors 40, in this disclosure, may be embodied as software, firmware, hardware or any combination thereof. Processors 40 may execute instructions stored by a storage device 42 of audio system 10, which may comprise a computer-readable, machine-readable, or processor-readable storage medium that comprises instructions that cause one or more processors, e.g., processor 40, to perform various functions. Storage device 42 may include any tangible or non-transitory computer-readable storage media, such as random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. Voice prints 22 may be stored by storage device 42.

Figure 3:
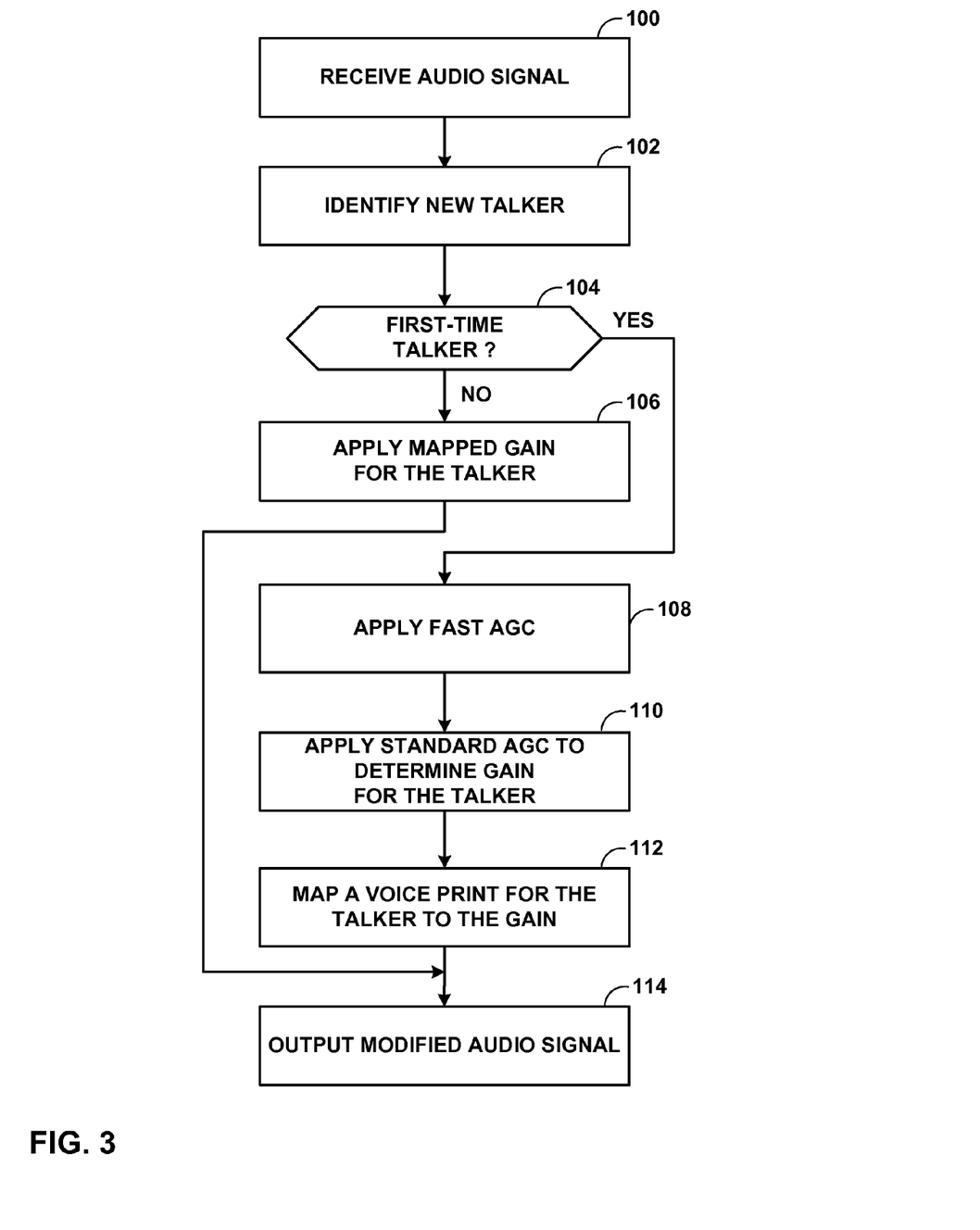
FIG. 3 is a flow chart illustrating an example operation of an audio system to rapidly adjust a gain responsive to the introduction of a new talker in an audio stream received by the audio system, in accordance with techniques described herein.

FIG. 3 is a flow chart illustrating an example operation of the audio system 10 of FIG. 2 to rapidly adjust a gain responsive to the introduction of a new talker in an audio stream received by the audio system, in accordance with techniques described herein. Audio system 10 receives electrical signal 17 that includes an audio signal waveform (100). Talker identification module 20 samples and analyzes a representation of the audio signal waveform to identify a new talker within the waveform (102). If the talker is a first-time talker for which talker identification module 20 is unable to match with one of voice prints 22 (YES branch of 104), talker identification module 20 directs AGC module 26 to apply fast AGC module 28 to rapidly adjust the gain for the new talker (108). In addition, AGC module 26 subsequently and/or concurrently applies standard AGC to converge upon a resultant gain for the new talker (110). AGC module 26 provides this resultant gain to talker identification module 20, which associates a voice print for the new talker with the resultant gain and stores the association to voice prints 22 (112).

If talker identification module 20 is able to match the talker to one of voice prints 22 (i.e., the talker has been previously identified by audio system 10) (NO branch of 104), then talker identification module 20 reads from voice prints 22 and provides the associated gain for the matched voice print to AGC module 26. Mapping module 30 applies the associated gain to the rapidly adjust the gain for the new talker (106). Audio system 10 continuously outputs modified electrical signal 18 that includes an audio signal waveform modified by the gain applied to the audio signal waveform of electrical signal 17 (114). Mapping module 30 may continue applying the associated for the new talker as additional new talkers are detected for application of the above-described techniques.

Figure 4:
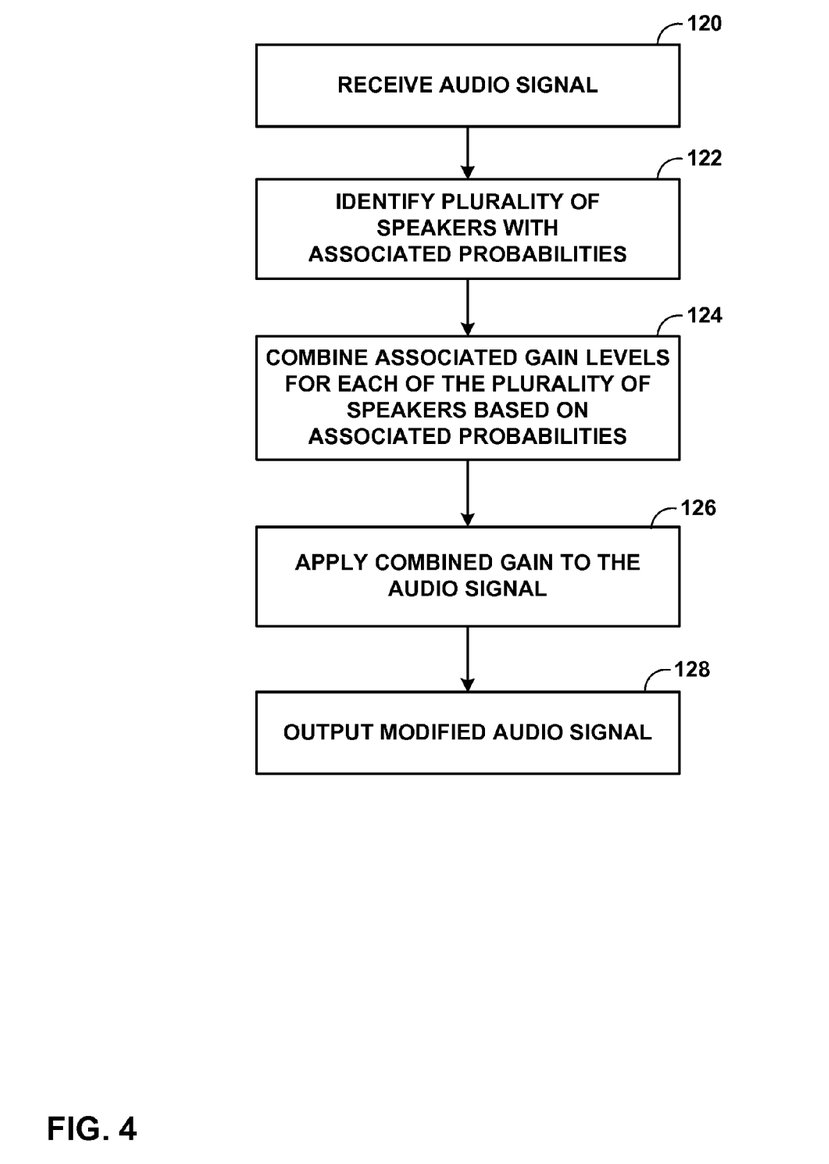
FIG. 4 is a flowchart illustrating an example mode of operation of audio system to apply a combined gain responsive to the introduction of a new talker in an audio stream received by the audio system, in accordance with the described techniques.

In some aspects of this operation, talker identification module 20 determines a probability of the input audio signal waveform with one of voice prints 22. A configurable or FIG. 4 is a flowchart illustrating an example mode of operation of audio system 10 to apply a combined gain responsive to the introduction of a new talker in an audio stream received by the audio system, in accordance with the described techniques. Audio system 10 receives electrical signal 17 that includes an audio signal waveform for a talker (120). Talker identification module 20 samples and matches a representation of the audio signal waveform with voice prints 22 with a plurality of possible talkers within the waveform each associated with a match probability for the talker (122). For example, talker identification module 20 may match a first talker with a match probability of 0.7 and may further match a second talker with a match probability of 0.3.

The possible matched talkers are associated in voice prints 22 with respective gains that talker identification module 20 combines based on the respective match probabilities to produce a combined gain (124). For example, talker identification module 20 may weight the gains by the match probability of the corresponding voice print and sum the weighted gains to produce the combined gain. Talker identification module 20 provides the combined gain to AGC module 26, and mapping module 30 applies the associated gain to rapidly adjust the gain for the new talker (126). Audio system 10 continuously outputs modified electrical signal 18 that includes an audio signal waveform modified by the gain applied to the audio signal waveform of electrical signal 17 (128).

Various embodiments have been described. These and other embodiments are within the scope of the following claims.

What is claimed is:

1. A method comprising:
processing an audio signal with an audio system to identify a first audio source;
determining whether the audio system stores an association between the first audio source and a gain;
when the audio system does not store the association between the first audio source and the gain, modifying an automatic gain control algorithm with the audio system to increase at least one of an attack or decay rate, and applying the modified automatic gain control algorithm to the audio signal to determine the gain for the first audio source;
applying, with the audio system, the gain for the first audio source to a representation of the audio signal to produce an output audio signal;
after applying the gain to the representation of the audio signal, restoring the automatic gain control algorithm with the audio system to reduce at least one of the attack or decay rate;
applying, with the audio system, the restored automatic gain control algorithm to the representation of the audio signal to determine a resultant gain for the first audio source;
associating a first voice print with the resultant gain;
storing the association of the first voice print with the resultant gain to a storage medium as the association between the first audio source and the resultant gain; and
outputting the output audio signal from the audio system.

2. The method of claim 1, further comprising:
applying, with the audio system, the resultant gain to the representation of the audio signal to produce the output audio signal.

3. The method of claim 1, further comprising:
associating the first audio source with the resultant gain; and
storing the association of the first audio source with the resultant gain to a storage medium.

4. The method of claim 1, wherein the audio system comprises one of a smart phone, a teleconferencing system, and a videoconferencing system.

5. The method of claim 1, wherein the audio system trains with the representation of the audio signal to learn respective voice print parameters to store as respective voice prints for one or more audio sources represented in the audio signal.

6. The method of claim 1, further comprising:
when the audio system stores the association between the first audio source and the gain, reading the gain for the first audio source; and
applying, with the audio system, the gain read for the first audio source.

7. The method of claim 1, wherein the audio system stores the association between the first audio source and the gain, the method further comprising:
determining, with the audio system, a probability of a matching voice print for the first audio source; and
when the probability does not meet a threshold probability, modifying the automatic gain control algorithm with the audio system to increase at least one of the attack or decay rate and applying the modified automatic gain control algorithm to the representation of the audio signal to determine the gain for the first audio source.

8. The method of claim 1, wherein the audio system stores the association between the first audio source and the gain, the method further comprising:
determining, with the audio system, a probability of a matching voice print for the first audio source;
when the probability meets a threshold probability, reading the gain for the first audio source; and
applying, with the audio system, the gain read for the first audio source.

9. The method of claim 1, further comprising:
when the audio system stores the association between the first audio source and the gain, determining, with the audio system, a non-zero probability of a matching voice print for the first audio source;
determining, with the audio system, a non-zero probability of a matching voice print for a second audio source;
reading the gain for the first audio source and a gain for the second audio source; and
applying a combination of the gain for the first audio source and the gain for the second audio source.

10. The method of claim 9, further comprising:
weighting the gain for the first audio source by the non-zero probability of the matching voice print for the first audio source and the gain for the second audio source by the non-zero probability of the matching voice print for the second audio source; and
summing the weighted gain for the first audio source and the weighted gain for the second audio source to produce the combination.

11. The method of claim 1, wherein modifying an automatic gain control algorithm with the audio system to increase at least one of an attack or decay rate comprises increasing the at least one of the attack or decay rate to provide sub-second automatic gain control convergence.

12. The method of claim 1, further comprising:
determining, with the audio system, a change in the distance from the first audio source to a microphone that produces the audio signal;
determining a gain modification based at least on the change in the distance; and
applying the gain modification to the gain for the first audio source.

13. The method of claim 1, further comprising:
when the audio system stores the association between the first audio source and the gain, applying, with the audio system, the automatic gain control algorithm to compute a new gain for the first audio source;
determining a difference between the gain for the first audio source and the new gain for the first audio source; and
applying the difference to a gain stored by the audio system and associated with a second audio source.

14. The method of claim 1, further comprising:
applying, with the audio system, a second instance of the automatic gain control algorithm with unmodified attack and decay rates to the representation of the audio signal concurrently with applying the modified automatic gain control algorithm to produce a resultant gain;
applying, with the audio system, the resultant gain to the representation of the audio signal to produce the output audio signal.

15. The method of claim 1, further comprising:
processing the representation of the audio signal with the audio system to identify a second audio source;
determining whether the audio system stores an association between the second audio source and a gain for the second audio source;
when the audio system does not store the association between the second audio source and the gain for the second audio source, modifying the automatic gain control algorithm with the audio system to increase at least one of the attack or decay rate and applying the modified automatic gain control algorithm to the representation of the audio signal to determine the gain for the second audio source;

applying, with the audio system, the gain for the second audio source to the representation of the audio signal to produce an output audio signal.

16. An audio system comprising:

a talker identification module that processes an audio signal to identify a first audio source and determines whether the audio system stores an association between the first audio source and a gain;

an automatic gain control module, wherein the talker identification module, when the audio system does not store the association between the first audio source and the gain, modifies the automatic gain control module to increase at least one of an attack or decay rate, wherein the automatic gain control module applies the modified automatic gain control algorithm to the audio signal to determine the gain for the first audio source, wherein the automatic gain control module applies the gain for the first audio source to a representation of the audio signal to produce an output audio signal, wherein the automatic gain control module, after applying the gain to the representation of the audio signal, restoring the automatic gain control algorithm with the audio system to reduce at least one of the attack or decay rate, wherein the automatic gain control module applies the restored automatic gain control algorithm to the representation of the audio signal to determine a resultant gain for the first audio source, wherein the talker identification module associates a first voice print with the resultant gain, and wherein the talker identification module stores the association of the first voice print with the resultant gain to a storage medium as the association between the first audio source and the resultant gain, and wherein the audio system outputs the output audio signal.

17. A computer-readable storage device comprising instructions that, when executed, perform operations comprising:

processing an audio signal with an audio system to identify a first audio source;

determining whether the audio system stores an association between the first audio source and a gain;

when the audio system does not store the association between the first audio source and the gain, modifying an automatic gain control algorithm with the audio system to increase at least one of an attack or decay rate and applying the modified automatic gain control algorithm to the audio signal to determine the gain for the first audio source;

applying, with the audio system, the gain for the first audio source to a representation of the audio signal to produce an output audio signal;

after applying the gain to the representation of the audio signal, restoring the automatic gain control algorithm with the audio system to reduce at least one of the attack or decay rate;

applying, with the audio system, the restored automatic gain control algorithm to the representation of the audio signal to determine a resultant gain for the first audio source:

associating a first voice print with the resultant gain;

storing the association of the first voice print with the resultant gain to a storage medium as the association between the first audio source and the resultant gain; and outputting the output audio signal from the audio system.

* * * * *